(12) United States Patent
Duda et al.

(10) Patent No.: US 8,621,194 B2
(45) Date of Patent: Dec. 31, 2013

(54) PROCESSOR NAND FLASH BOOT SYSTEM AND METHOD

(75) Inventors: James A. Duda, Waltham, MA (US);
Andre M. Hassan, Windham, NH (US);
Nathan J. Dohm, Natick, MA (US);
Robert Swope Fleming, Arlington, MA (US); Michael Joseph Schaffstein, Waltham, MA (US)

(73) Assignee: Conexant Systems, Inc., Irvine, CA (US)

( * ) Notice: Subject to any disclaimer, the term of this patent is extended or adjusted under 35 U.S.C. 154(b) by 593 days.

(21) Appl. No.: 12/872,733

(22) Filed: Aug. 31, 2010

(65) Prior Publication Data

US 2012/0054476 A1 Mar. 1, 2012

(51) Int. Cl.
*G06F 15/177* (2006.01)

(52) U.S. Cl.
USPC ............................. 713/2; 711/103; 714/6.11

(58) Field of Classification Search
USPC ................................ 711/103; 713/2; 714/6.11
See application file for complete search history.

(56) References Cited

U.S. PATENT DOCUMENTS

| | | | |
|---|---|---|---|
| 4,435,641 A | 3/1984 | Hajime | |
| 4,454,542 A | 6/1984 | Miyazawa | |
| 4,758,084 A | 7/1988 | Tokumi et al. | |
| 7,006,377 B2 | 2/2006 | Oh | |
| 7,234,052 B2 | 6/2007 | Lee et al. | |
| 7,996,711 B2 * | 8/2011 | Edwards et al. | 714/6.11 |
| 8,122,303 B2 * | 2/2012 | Ni et al. | 714/710 |
| 8,386,738 B1 * | 2/2013 | Sun | 711/167 |
| 2007/0260869 A1 | 11/2007 | Dade et al. | |

* cited by examiner

*Primary Examiner* — Albert Wang
(74) *Attorney, Agent, or Firm* — Jackson Walker L.L.P.; Christopher J. Rourk

(57) ABSTRACT

A system for booting a processor from NAND flash, comprising a NAND agnostic boot controller and a NAND flash device, wherein the NAND flash device further comprises a boot wrapper storing boot code in a predetermined format.

19 Claims, 3 Drawing Sheets

PROCESSOR NAND FLASH BOOT SYSTEM AND METHOD

FIELD OF THE INVENTION

The invention relates to booting of processors, and more particularly to a system and method for booting a processor from a NAND flash device that does not require any device-specific parameters of the NAND flash device to be utilized by the boot processor.

BACKGROUND OF THE INVENTION

"Booting" refers to the process of starting a processor by loading the operating system code into the processor. This operating system code must be stored in a non-volatile data memory device. NAND flash devices are inexpensive and have other features that make them attractive for the use of storing boot code, but booting from NAND flash is very complicated due to the large variety of NAND flash vendors, page sizes, error correction code (ECC) requirements, block sizes, and other device-specific parameters. The uncertainty of how future NAND flash devices will be designed makes the use of NAND flash for storing boot code even more difficult to implement.

SUMMARY OF THE INVENTION

A system for booting a processor from a NAND flash device is provided that does not require any of the device-specific parameters of the NAND flash device to be utilized by the boot controller. The system includes a NAND agnostic boot controller, which can boot from the NAND flash device without regard to the device-specific parameters of the NAND flash device. The NAND flash device includes a boot wrapper storing boot code in a predetermined format, where the NAND agnostic boot controller is configured to access the boot code stored in the boot wrapper.

DETAILED DESCRIPTION OF PREFERRED EMBODIMENTS

Figure 1:
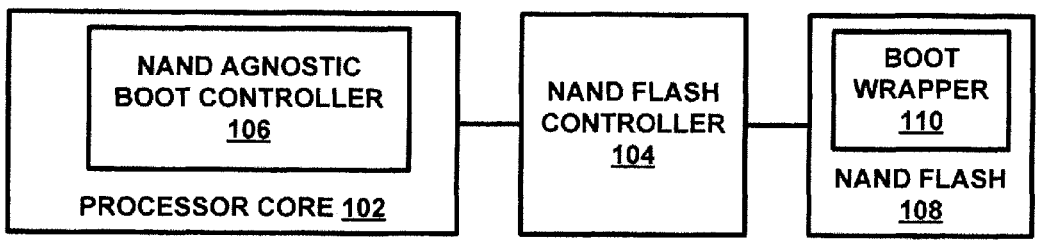
FIG. 1 is a diagram of a system for booting a processor from a NAND flash memory device in accordance with an exemplary embodiment of the present invention.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for booting a processor from a NAND flash memory device in accordance with an exemplary embodiment of the present invention. System 100 allows any NAND flash memory device to be used regardless of device-specific design variations, such as by using a device agnostic boot controller and a boot code wrapper for the boot code stored on the NAND flash memory device, or in other suitable manners.

System 100 includes processor core 102 and NAND agnostic boot controller 106, which can be an ARM9 processor core or other suitable processors. NAND flash controller 104 is coupled to processor core 102, and receives commands or data from processor core 102 and NAND agnostic boot controller 106 that allows data to be retrieved from NAND flash 108, which includes boot wrapper 110. NAND flash 108 can utilize any suitable proprietary page sizes, error correction code (ECC) requirements, block sizes, page header structure sizes, and other device-specific parameters, but includes boot wrapper 110 that provides a predefined boot code data structure that allows NAND agnostic boot controller 106 to identify the starting boundaries of images to load from NAND flash 108. NAND agnostic boot controller 106 opens the first page of data from boot wrapper 110 and extract the first 1024 bytes of information, which contains the data that defines how to walk through NAND flash 106, which is embedded within the byte stream of the boot code in boot wrapper 110 of NAND flash 108. Other suitable data structures can also or alternatively be used, such as 512 bytes of data, 2048 bytes of data, or data blocks that may be supported by any expected NAND device that may be used.

In operation, system 100 provides an architecture for allowing NAND flash to be used to store boot code, despite the significant variations in device-specific parameters such as page sizes, error correction code (ECC) requirements, block sizes, and other device-specific parameters. System 100 can also accommodate new NAND flash device parameters through the use of NAND agnostic boot controller 106 and boot wrapper 110, because system 100 only requires the first page of boot code to be opened and the first 1024 bytes of data to be extracted, as the instructions for walking through NAND flash 108 are embedded within the byte stream in the boot wrapper.

Figure 2:
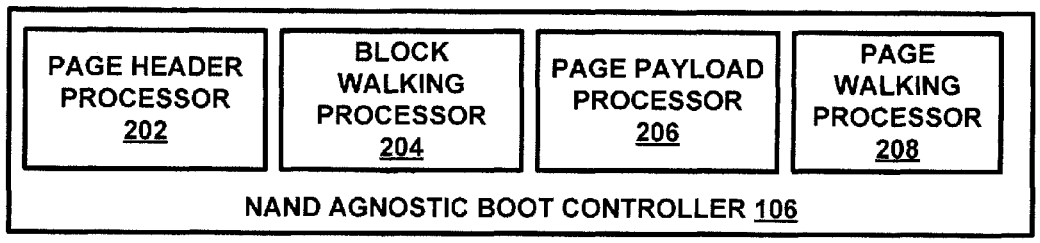
FIG. 2 is a diagram of a system for a NAND agnostic boot controller in accordance with an exemplary embodiment of the present invention.

FIG. 2 is a diagram of a system 200 for a NAND agnostic boot controller in accordance with an exemplary embodiment of the present invention. System 200 can be implemented in software operating on an ARM9 processor core or other suitable combinations of hardware and software.

System 200 includes NAND agnostic boot controller 106, page header processor 202, block walking processor 204, page payload processor 206 and page walking processor 208, each of which can be implemented in hardware, software, or a suitable combination of hardware and software, and which can be one or more software systems operating on an ARM9 processor core or other suitable hardware platforms. As used herein and by way of example and not by limitation, "hardware" can include a combination of discrete components, an integrated circuit, an application-specific integrated circuit, a field programmable gate array, a digital signal processor, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Page header processor 202 includes a page header structure processor that is used to identify the start of each NAND Page. The start of a NAND page can be identified by a static signature field, having a predetermined value (such as 0x49464e4f), or in other suitable manners. Page header processor 202 can also identify an image page index field that is used to identify the index of the current page within the current bootable image, independent of the physical page address of the NAND Flash. Page header processor 202 can also identify a block page index that is used to identify the index of the current physical page within the NAND flash device, which can be used in the event the block walking structure or page walking structure are deemed corrupt and unusable. In one exemplary embodiment, if a device has 64 pages per block, the block page index for the second page of the third block would be 130 (i.e., (64 pages*2 blocks)+2 pages). Page header processor 202 can also process an image identifier field that is used to identify the current image as a function of the total number of redundant images in the NAND flash device. Page header processor 202 can also or alternatively be used to perform other suitable functions.

Block walking processor 204 allows the boot ROM program to quickly move from within the current image to the start of the next image. In one exemplary embodiment, the boot ROM program can use this structure when it is hunting for the start of an image, such as when the current image is determined to be corrupted or in other suitable manners. Block walking processor 204 can also process a next block page index that is used to compare against a block page index that is read after moving to the next block, to verify the integrity of the move to the next block. Block walking processor 204 can also process the numInits fields and the ~numInits fields, which are used to identify the number of configuration cycles required to perform the block move operation (the ~numinits value can be the compliment of the numInits value). In one exemplary embodiment, the numInits fields are an array of register operations required to cause the NAND flash controller 104 to advance to the next NAND flash block/page offset. Block walking processor 204 can also or alternatively be used to perform other suitable functions.

Page payload processor 206 processes an array of 32-bit double words ("dwords"). The page payload contains the information found in the bootable flash device data structure. The size of the dword array can be defined by a variable that identifies a number of payload dwords.

Page walking processor 208 allows the boot ROM program to move to the next page of the current image. In one exemplary embodiment, a next block page index can be compared against a block page index that is read after moving to the next block, to verify the integrity of the move to the next block. Page walking processor 208 can also process numInits fields and ~numInits fields that are used to identify the number of configuration cycles required to perform the block move operation (the ~numinits value can be the compliment of the numInits values). The numInits field can be an array of register operations required to cause the NAND flash controller to advance to the next NAND flash page offset.

In operation, system 200 provides a processor for processing boot code in a NAND flash device that is packaged in a predetermined boot wrapper and having a predetermined structure, where instructions for walking through the NAND flash device are embedded within the byte stream stored in the NAND flash device. System 200 thus provides a NAND agnostic boot controller that can accommodate existing and future NAND devices, regardless of device-specific parameters.

Figure 3:
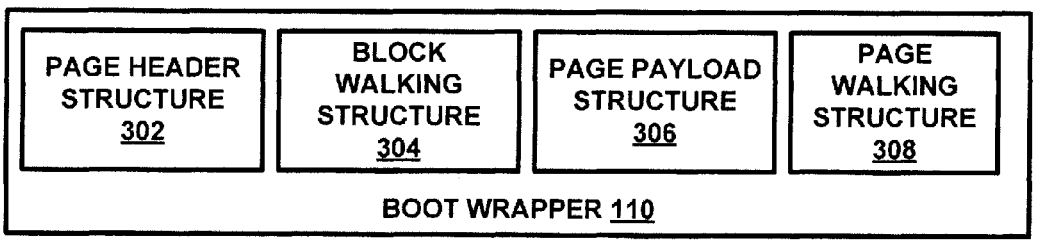
FIG. 3 is a diagram of a system for providing a boot wrapper for boot code to be stored on a NAND flash device in accordance with an exemplary embodiment of the present invention.

FIG. 3 is a diagram of a system 300 for providing a boot wrapper for boot code to be stored on a NAND flash device in accordance with an exemplary embodiment of the present invention. System 300 includes boot wrapper 110 and page header structure 302, block walking structure 304, page payload structure 306 and page walking structure 308, each of which can be implemented in hardware, software or a suitable combination of hardware and software, and which can be one or more code systems stored in a predetermined format of a NAND flash device.

In one exemplary embodiment, NAND boot image data can be organized within the underlying NAND flash page as a series of code words, where a code word includes data followed by a predetermined number of ECC bytes that are used to protect the integrity of the associated data. The boot ROM program can construct all NAND code words using a predetermined payload size, such as 968 bytes of payload with 30-bits of ECC protection. The boot ROM program can be used to configure the NAND flash controller to use predetermined boot variable values that are used to configure the boot ROM program within boot wrapper 110. In this exemplary embodiment, each NAND boot code word can total 1021 bytes in size, including 968 payload bytes plus 53 redundancy bytes, or other suitable code byte allocations can also or alternatively be used. NAND boot code words can be positioned adjacent to each other within the NAND flash page with the first code word of each page starting on the zero boundary of each page. If the NAND boot code word size is very close to 1024 bytes, and all large page NAND flash device page sizes are N*2048 bytes in size, then the NAND boot code words fit very well into the standard page sizes of all NAND flash devices, regardless of device-specific parameters. The NAND flash boot sequence of system 300 makes no use of the NAND spare area, thus avoiding any complications that might be introduced by the existence of varying sizes of NAND spare areas across different NAND flash devices.

The NAND flash boot sequence supports multiple redundant images. The boot ROM program can hunt for NAND flash images starting from page zero of the NAND Flash, and can use the NAND flash paging structure to identify the starting boundaries of images to load, as long as each image starts on a block boundary in the NAND flash device. System 300 allows the boot ROM program to require no data defining the underlying NAND flash technology, such as vendor, technology, page size, or spare size. Instead, the boot ROM program opens the first page and extracts the first 1024 bytes of data, which includes the encoded process for how to walk through the underlying NAND flash device to extract the boot code.

Page header structure 302 stores page header structure data such as a signature string, an image page index, a block page index, an image identifier code and other suitable data, so as to coordinate with system 200 regardless of the specific hardware design of the NAND flash device on which system 300 is stored.

Block walking structure 304 stores a next block page index, a number of initialization operations and other suitable data, so as to coordinate with system 200 regardless of the specific hardware design of the NAND flash device on which system 300 is stored.

Page payload structure 306 stores a number of boot image dwords and other suitable data, so as to coordinate with system 200 regardless of the specific hardware design of the NAND flash device on which system 300 is stored.

Page walking structure 308 stores a next block page index, a number of initialization operations and other suitable data, so as to coordinate with system 200 regardless of the specific hardware design of the NAND flash device on which system 300 is stored.

In operation, system 300 allows a NAND flash device to store boot code in a boot wrapper 110 having a structure that allows a processor to boot from NAND flash regardless of the specific hardware design of the NAND flash device.

Figure 4:
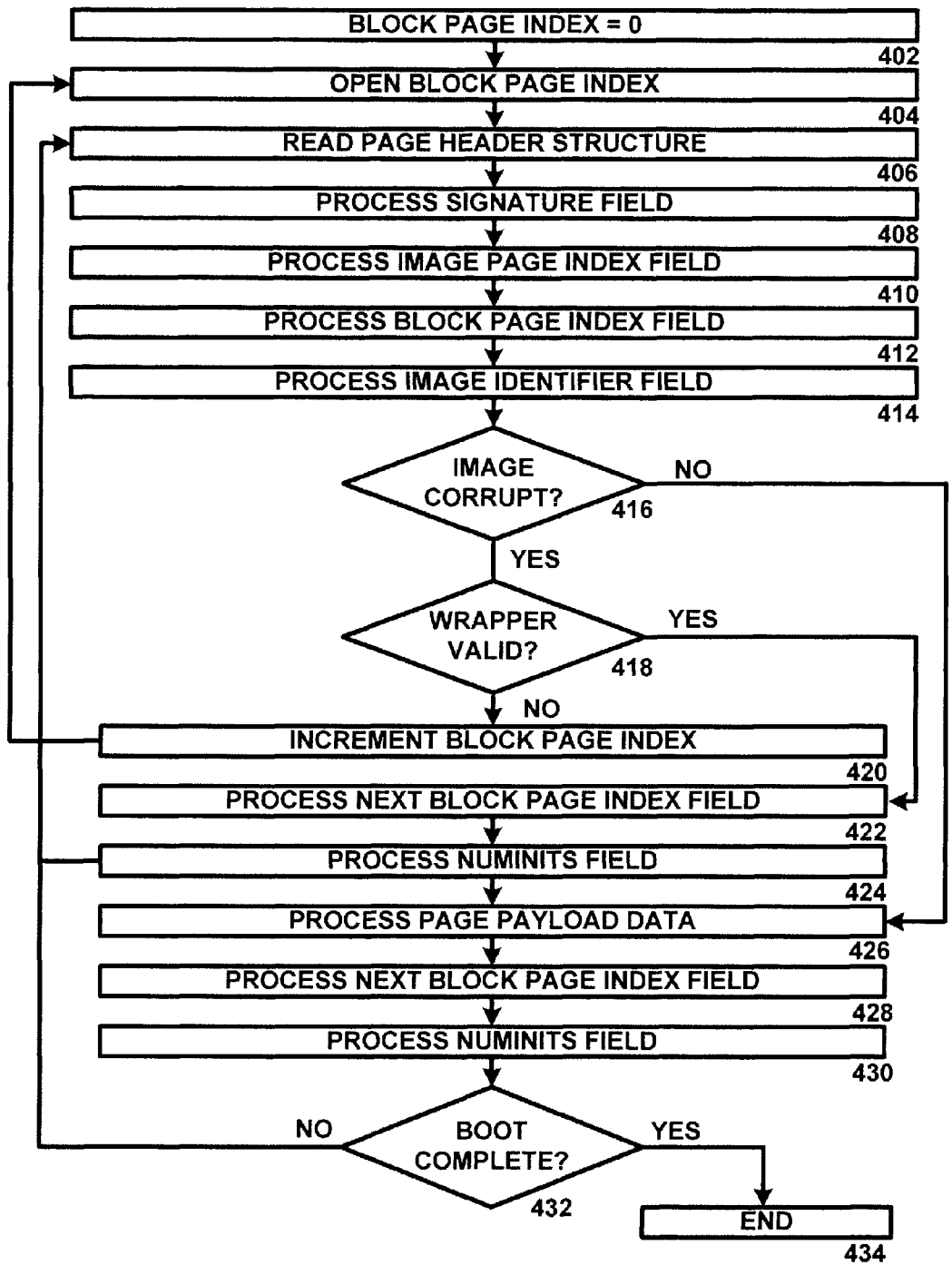
FIG. 4 is a diagram of an algorithm for NAND agnostic boot control in accordance with an exemplary embodiment of the present invention.

FIG. 4 is a diagram of an algorithm 400 for NAND agnostic boot controller in accordance with an exemplary embodiment of the present invention. Algorithm 400 begins at 402, where the running block page index value is initialized to zero. The algorithm then proceeds to 404 where the physical NAND page identified by block page index is opened and made available for reading. The algorithm then proceeds to 406 where a page header structure is read to identify the start of a NAND page. The algorithm then proceeds to 408 where a signature field is processed, such as to identify a static value having a predetermined value such as 0x49464e4f or other suitable data values. The algorithm then proceeds to 410.

At 410, an image page index field is processed, such as to identify a current page index of an image. The algorithm then proceeds to 412 where a block page index field is processed, such as to determine a current physical NAND page number. The algorithm then proceeds to 414, where an image identifier field is processed, such as to extract an image identifier code. The algorithm then proceeds to 416.

At 416, it is determined whether the image is corrupt. If it is determined that the image is not corrupt and that boot code processing can proceed, the algorithm proceeds to 426. Otherwise, the algorithm proceeds to 418 where a determination is made if the current section of the boot wrapper is valid. Note that the current section of the boot wrapper may be deemed invalid due to an ECC error, or for other suitable reasons. If the current section of the boot wrapper is deem valid, the algorithm proceeds to 422. Otherwise the algorithm proceeds to 420 where the block page index is incremented followed by a movement of the algorithm to 404 where the next flash page is opened in a speculative manner in order to hunt for the next valid section of the boot wrapper. When the current section of boot wrapper is valid, the algorithm moves to step 422 where the next block page index field is processed. The next block page index is used to compare against the block page index that is read after moving to the next block, to verify the integrity of the move to the next block. The algorithm then proceeds to 424, where the number of configuration cycles required to perform the block move operation is determined and processed. The algorithm then returns to 406.

At 426, the page payload data is processed to allow boot code processing. The algorithm then proceeds to 428 where the next block page index field is processed, such as to compare against the block page index that is read after a move to a next block is made, to verify the integrity of the move to the next block. The algorithm then proceeds to 430, where the number of configuration cycles required to perform the page move operation is determined and processed. The algorithm then proceeds to 432.

At 432, it is determined whether the boot process is complete. If it is determined that the boot process is not complete, the algorithm returns to 406, otherwise, the algorithm proceeds to 434 and terminates.

In operation, algorithm 400 allows a processor to boot from a NAND flash device without requiring the specific hardware design of the NAND flash device to be known by the boot controller.

Figure 5:
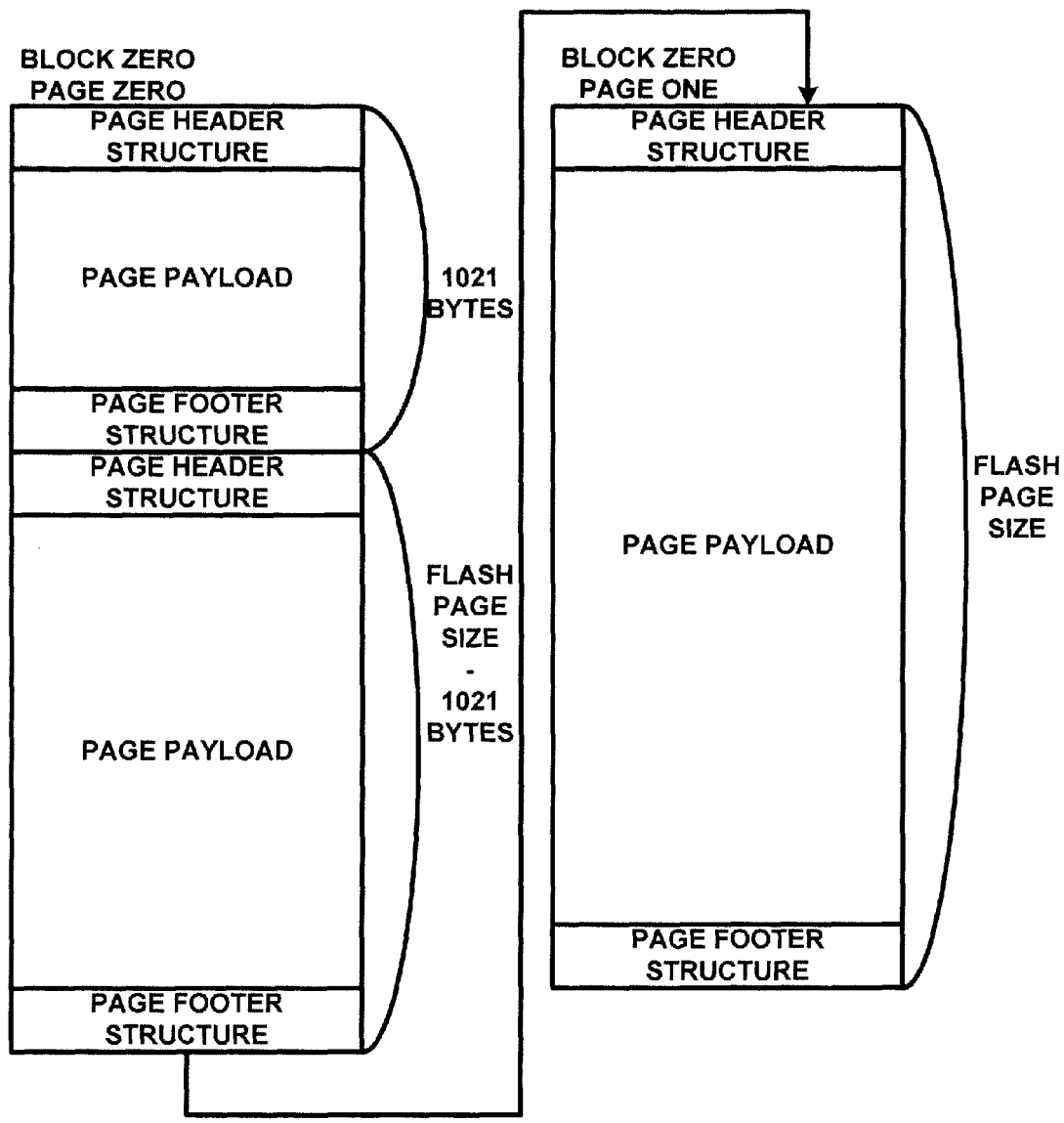
FIG. 5 is a diagram of an exemplary NAND flash page structure in accordance with an exemplary embodiment of the present invention.

FIG. 5 is a diagram 500 of an exemplary boot wrapper structure in accordance with an exemplary embodiment of the present invention. As shown in diagram 500, the boot wrapper structure starts at NAND Flash block zero, page zero, and includes a page header structure, a page payload, and a page footer structure. Regardless of the actual size of these data structures, a predetermined boot wrapper section size of 1021 bytes is utilized, although other suitable page sizes can also or alternatively be utilized. The next boot wrapper section includes a page header structure, a page payload and a page footer structure, whose size is defined by the size of the NAND Flash page minus 1021 bytes. This boot wrapper section is followed by a boot wrapper section at block zero, page one of the NAND flash device, which again incorporates a page header structure, a page payload and a page footer structure but where the boot wrapper section size is equal to the size of the NAND Flash page.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for booting a processor from NAND flash, comprising:
a NAND agnostic boot controller; and
a NAND flash device, wherein the NAND flash device further comprises a boot wrapper storing boot code in a predetermined format and a block walking structure configured to identify a process for moving from a current image of the NAND flash device to a next sequential image of the NAND flash device.

2. The system of claim 1 wherein the boot wrapper further comprises a page header structure configured to identify a start of each of a plurality of pages of the NAND flash device.

3. The system of claim 2 wherein the NAND agnostic boot controller comprises a page header processor configured to read the page header structure to identify the start of each of the plurality of pages of the NAND flash device.

4. The system of claim 2 wherein the NAND agnostic boot controller comprises a page header processor configured to read the start of each of the plurality of pages of the NAND flash device from the boot header structure of the boot wrapper.

5. The system of claim 1 wherein the boot wrapper further comprises a page payload structure configured to provide an array of data words.

6. The system of claim 5 wherein the NAND agnostic boot controller comprises a page payload processor configured to read the array of data words.

7. The system of claim 1 wherein the boot wrapper further comprises a page walking structure configured to identify a process for moving from a current page of the NAND flash device to a next sequential page of the NAND flash device.

8. The system of claim 7 wherein the NAND agnostic boot controller comprises a page walking processor configured to move from the current page of the NAND flash device to the next sequential page of the NAND flash device.

9. The system of claim 7 wherein the NAND agnostic boot controller comprises a page walking processor configured to read the process for moving from the current page of the NAND flash device to the next sequential page of the NAND flash device from the boot wrapper and to automatically implement the process.

10. The system of claim 1 wherein the NAND agnostic boot controller comprises a block walking processor configured to move from the current image of the NAND flash device to the next sequential image of the NAND flash device.

11. The system of claim 1 wherein the NAND agnostic boot controller comprises a block walking processor configured to read the process for moving from the current image of the NAND flash device to the next sequential image of the NAND flash device from the boot wrapper and to automatically implement the process.

12. The system of claim 1 wherein the boot wrapper further comprises a page payload structure storing a number of boot image dwords.

13. The system of claim 12 wherein the NAND agnostic boot controller comprises a page payload processor configured to read the number of boot image dwords from the boot wrapper and to process the boot wrapper using the number of boot image dwords.

14. The system of claim 1 wherein the boot wrapper further comprises a page walking structure storing a number of initialization operations.

15. The system of claim 14 wherein the NAND agnostic boot controller comprises a page walking processor configured to read the number of initialization operations from the boot wrapper and to process the boot wrapper using the number of initialization operations.

16. The system of claim 1 wherein the NAND agnostic boot controller is configured to initialize a running block page index value to zero, open a physical NAND page identified by block page index of the boot wrapper, read a page header structure to identify a start of a NAND page, process a signature field to identify a static value having a predetermined value, and process an image page index field of a boot wrapper to identify a current page index of an image.

17. The system of claim 16 wherein the NAND agnostic boot controller is further configured to process a block page index field to determine a current physical NAND page number, process an image identifier field to extract an image identifier code and to determine whether an image is corrupt.

18. The system of claim 17 wherein the NAND agnostic boot controller is further configured to determine if a current section of a boot wrapper is valid and to increment a block page index if the current section of the boot wrapper is invalid.

19. A system for booting a processor from NAND flash, comprising:
a NAND flash device, wherein the NAND flash device further comprises a boot wrapper storing boot code in a predetermined format, the boot wrapper further comprising:
a page header structure for identifying a start of each of a plurality of pages of the NAND flash device;
a block walking structure for identifying a process for moving from a current image of the NAND flash device to a next sequential image of the NAND flash device;
a page payload structure for providing an array of data words; and
a page walking structure for identifying a process for moving from a current page of the NAND flash device to a next sequential page of the NAND flash device; and
a NAND agnostic boot controller further comprising:
a page header processor for reading the page header structure to identify the start of each of the plurality of pages of the NAND flash device;
a block walking processor moving from the current image of the NAND flash device to the next sequential image of the NAND flash device;
a page payload processor for reading the array of data words; and
a page walking processor for moving from the current page of the NAND flash device to the next sequential page of the NAND flash device.

\* \* \* \* \*